(12) United States Patent  (10) Patent No.: US 8,334,935 B2
Yoon  (45) Date of Patent: *Dec. 18, 2012

(54) HIGH RESOLUTION DMD PROJECTION SYSTEM

(75) Inventor: Youngshik Yoon, Valencia, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 618 days.

This patent is subject to a terminal disclaimer.

(21) Appl. No.: 12/448,338

(22) PCT Filed: Dec. 19, 2006

(86) PCT No.: PCT/US2006/048407
§ 371 (c)(1),
(2), (4) Date: Jun. 17, 2009

(87) PCT Pub. No.: WO2008/076114
PCT Pub. Date: Jun. 26, 2008

(65) Prior Publication Data
US 2010/0026910 A1    Feb. 4, 2010

(51) Int. Cl.
*G02F 1/00* (2006.01)

(52) U.S. Cl. ............ 348/771; 348/745; 353/31; 353/34; 353/94

(58) Field of Classification Search ................... 348/744, 348/750, 756, 758, 759, 771, 782, 745; 353/30–33, 353/34, 94
See application file for complete search history.

(56) References Cited

U.S. PATENT DOCUMENTS

| 3,704,061 | A | 11/1972 | Travis |
| 5,517,340 | A | 5/1996 | Doany et al. |
| 5,555,035 | A | 9/1996 | Mead et al. |
| 5,903,304 | A | 5/1999 | Deter |
| 6,250,763 | B1 | 6/2001 | Fielding et al. |
| 6,266,105 | B1 | 7/2001 | Gleckman |
| 6,515,734 | B1 | 2/2003 | Yamada et al. |
| 6,644,813 | B1 | 11/2003 | Bowron |
| 6,648,475 | B1 | 11/2003 | Roddy et al. |
| 6,799,851 | B2 | 10/2004 | Yoon |
| 6,863,400 | B1 | 3/2005 | Liang |
| 6,886,943 | B1* | 5/2005 | Greenberg et al. ............. 353/94 |
| 7,230,656 | B2 | 6/2007 | Penn et al. |
| 7,386,125 | B2 | 6/2008 | Bilobrov et al. |
| 7,515,746 | B2* | 4/2009 | Pettitt ........................... 382/167 |
| 7,794,092 | B2* | 9/2010 | Drazic et al. .................... 353/84 |
| 7,862,182 | B2* | 1/2011 | Thollot et al. .................. 353/84 |
| 2001/0024268 | A1 | 9/2001 | Fielding et al. |
| 2002/0008770 | A1 | 1/2002 | Ho et al. |

(Continued)

FOREIGN PATENT DOCUMENTS

CN    1424623 A    6/2003

(Continued)

OTHER PUBLICATIONS

Search Report dated Sep. 13, 2007.

*Primary Examiner* — Jefferey Harold
*Assistant Examiner* — Humam Satti
(74) *Attorney, Agent, or Firm* — Robert D. Shedd; Harvey D. Fried; Richard LaPeruta

(57) ABSTRACT

A high resolution projection system has a light source for generating and emitting light and a plurality of digital micromirror device imagers configured to receive and reflect the light.

7 Claims, 2 Drawing Sheets

U.S. PATENT DOCUMENTS

| | | | |
|---|---|---|---|
| 2002/0051094 A1 | 5/2002 | Makita | |
| 2004/0100589 A1 | 5/2004 | Ben-David et al. | |
| 2004/0130682 A1 | 7/2004 | Tomita | |
| 2004/0184005 A1 | 9/2004 | Roth | |
| 2004/0233342 A1 | 11/2004 | Kim et al. | |
| 2005/0088629 A1* | 4/2005 | Greenberg et al. | 353/94 |
| 2005/0162615 A1* | 7/2005 | Penn | 353/31 |
| 2005/0168708 A1 | 8/2005 | Huang | |
| 2005/0206846 A1 | 9/2005 | Yeung et al. | |
| 2005/0237487 A1 | 10/2005 | Chang | |
| 2006/0038964 A1 | 2/2006 | Lu et al. | |
| 2006/0039068 A1 | 2/2006 | Tokita et al. | |
| 2006/0044525 A1 | 3/2006 | Lee et al. | |
| 2006/0152524 A1 | 7/2006 | Miller et al. | |
| 2006/0203209 A1 | 9/2006 | De Vaan | |
| 2006/0220199 A1 | 10/2006 | Duboc et al. | |
| 2006/0290777 A1* | 12/2006 | Iwamoto et al. | 348/49 |
| 2007/0139624 A1 | 6/2007 | DeCusatis et al. | |
| 2007/0195275 A1 | 8/2007 | Drazic et al. | |
| 2008/0151354 A1 | 6/2008 | Mehrl | |
| 2009/0108182 A1 | 4/2009 | Thiebaud et al. | |
| 2009/0140974 A1 | 6/2009 | Maeda | |
| 2010/0014008 A1* | 1/2010 | Yoon | 348/771 |
| 2010/0026959 A1 | 2/2010 | Yoon et al. | |
| 2010/0104260 A1 | 4/2010 | Yoon et al. | |
| 2010/0315596 A1 | 12/2010 | Yoon | |
| 2011/0013143 A1* | 1/2011 | Yoon | 352/60 |

FOREIGN PATENT DOCUMENTS

| | | |
|---|---|---|
| DE | 19626097 | 10/1997 |
| DE | 19626097 C1 | 10/1997 |
| EP | 1220549 A2 | 7/2002 |
| EP | 1317148 A1 | 6/2003 |
| FR | 2872924 | 1/2006 |
| JP | 8289218 | 1/1996 |
| JP | 10268230 | 10/1998 |
| JP | 11-505334 A | 5/1999 |
| JP | 2002-287247 A2 | 10/2002 |
| JP | 2004-205919 A2 | 7/2004 |
| JP | 2004205919 A * | 7/2004 |
| JP | 2005241904 | 9/2005 |
| JP | 2006-58588 A | 3/2006 |
| JP | 2006-276311 A2 | 10/2006 |
| JP | 2007-017536 A2 | 1/2007 |
| JP | 2007-519372 A | 7/2007 |
| WO | 98/00746 A1 | 1/1998 |
| WO | WO0191471 | 11/2001 |
| WO | WO2004040899 | 5/2004 |
| WO | 2005/074258 A1 | 8/2005 |
| WO | WO2006057001 | 6/2006 |
| WO | 2006/118881 A2 | 11/2006 |
| WO | WO2006118881 | 11/2006 |

* cited by examiner

HIGH RESOLUTION DMD PROJECTION SYSTEM

CROSS-REFERENCE TO RELATED APPLICATIONS

This application relates to U.S. application Ser. No. 12/448,320 filed on Jun. 17, 2009 which published as US 2010-0014008A1; Ser. No. 12/312,998 filed on Jun. 3, 2009 which published as US 2010-0315596A1; Ser. No. 12/448, 002 filed on Jun. 3, 2009 which published as US 2010-0026959A1; and Ser. No. 12/450,683 filed on Oct. 6, 2009 which published as US20110013143A1.

This application claims the benefit, under 35 U.S.C. §365 of International Application PCT/US2006/048407, filed Dec. 19, 2006, which was published in accordance with PCT Article 21(2) on Jun. 26, 2008 in English.

FIELD OF THE INVENTION

The invention relates to a digital micromirror device (DMD) projection system. In particular, the invention relates to a high resolution DMD projection system.

BACKGROUND OF THE INVENTION

With the advent of digital micromirror devices (DMD devices) such as digital light processors (DLPs) there has been a desire to integrate the digital projection technology into cinematic theatres for viewing by the public at large. However, as of yet, DMDs (and DLPs in particular) have not yet progressed in native resolution capability so as to allow an acceptable image for large venues which complies with industry standards for display quality. Particularly, the Society of Motion Picture and Television Engineers (SMPTE) promulgates such standards which are well respected by the various members of the motion picture industry. One such standard applies to the display of a all of a Digital Cinema Distribution Masters (DCDMs) (digital packages which contains all of the sound, picture, and data elements needed for a show) in review rooms and theatres. A requirement of the SMPTE standard is that the pixel count of the projected image must be at least 2048×1080 (2K×1K). The standard further requires that the mesh of pixels (the device structure) must be invisible/imperceptible when viewed from a reference viewing distance. While many DMD/DLP projectors meet the minimum requirement regarding resolution, those same projectors cannot meet the second requirement of the standard since the proper reference viewing distance is small enough to cause visibility of the mesh of pixels. Therefore, current DMD/DLP projectors having 2K×1K resolution are not suitable for most commercial theatres where the viewing distance is small and where to prevent the appearance of the pixel mesh from an appropriate viewing distance, a DMD/DLP projector must have a resolution of about 4K×2K (which is not currently commercially available).

It is therefore desirable to develop an improved DMD/DLP projection system.

SUMMARY OF THE INVENTION

A high resolution projection system has a light source for generating and emitting light and a plurality of digital micromirror device imagers configured to receive and reflect the light.

DETAILED DESCRIPTION OF THE INVENTION

Figure 1:
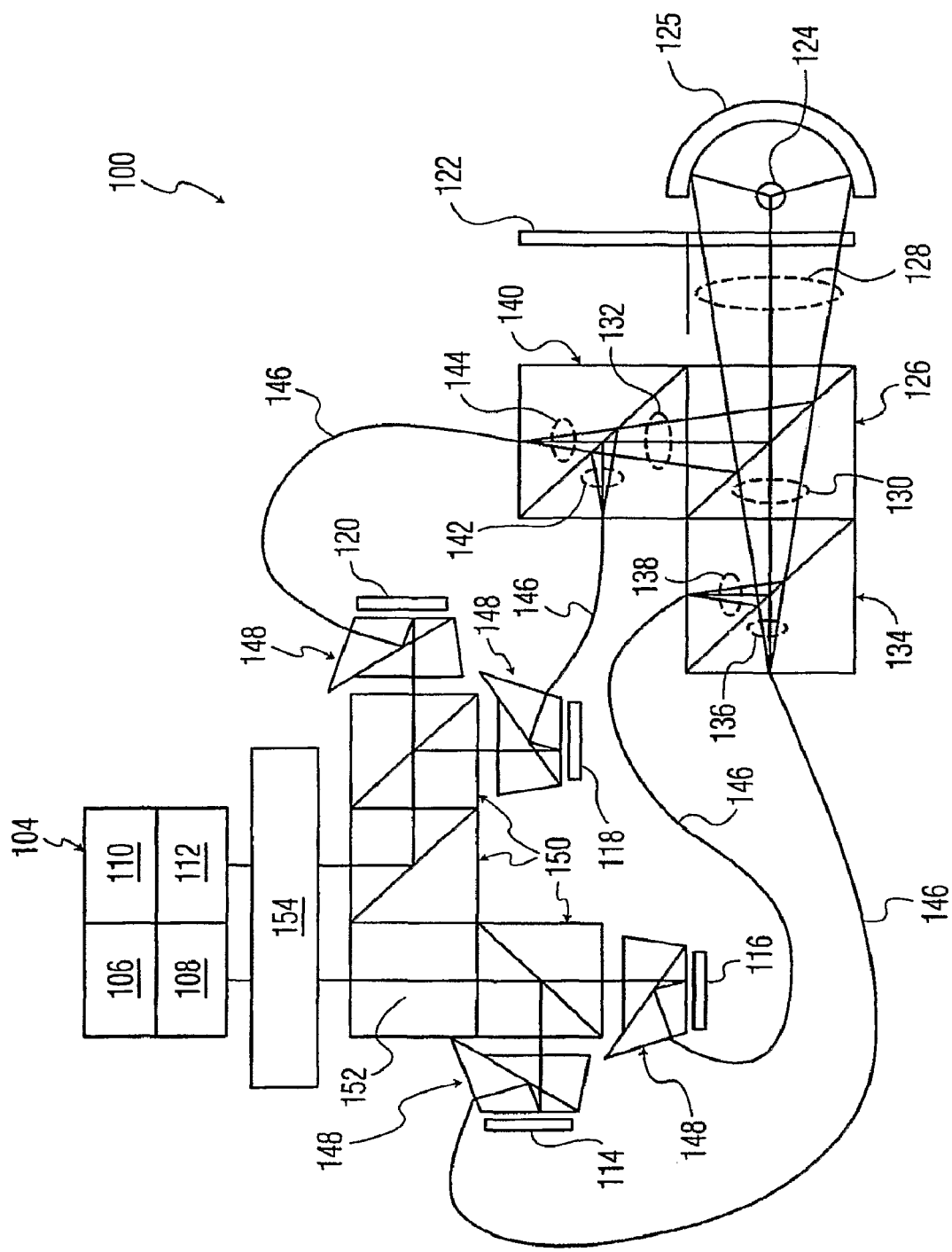
FIG. 1 is a schematic illustration of a high resolution digital micromirror device projection system according to an embodiment of the present invention.

Referring now to FIG. 1 in the drawings, a high resolution DMD projection system according to an embodiment of the present invention is illustrated. While it is currently thought that a single DMD/DLP imager having resolution of about 2048×1080 (2K×1K) is insufficient for accurately reproducing an entire frame of motion picture image data onto a display surface, high resolution DMD projection system 100 advantageously utilizes a plurality of commercially available DMD/DLP imagers (each having resolution of about 2K×1K) to accomplish a total projected image resolution of about 4K×2K, a result acceptable by SMPTE standards. To accomplish this, the entire frame of a target display surface 104 is divided into four regions, an upper left region 106, a lower left region 108, an upper right region 110, and a lower right region 112. Region 106 is to be projected onto by DMD/DLP imager 114, region 108 is to be projected onto by DMD/DLP imager 116, region 110 is to be projected onto by DMD/DLP imager 118, and region 112 is to be projected onto by DMD/DLP imager 120 such that each imager 114, 116, 118, 120 projects only a discrete portion of an entire frame of a motion picture image. In this embodiment, each imager 114, 116, 118, 120 is configured to project a substantially equal area of an entire frame of a motion picture image onto the display surface 104. However, it will be appreciated that in alternative embodiments, the imagers may be configured to project unequal portions of a motion picture image while still providing a high resolution display. Each DMD/DLP imager 114, 116, 118, and 120 is substantially similar to known single-imager type DMD/DLP imagers, but instead of each DMD/DLP imager 114, 116, 118, and 120 having a color wheel filter (as known in the art), a single color wheel filter 122 is used.

In operation, white light or full spectrum light is emitted from a light source 124 and is directed through the spinning color wheel filter 122, possibly with guidance from an elliptical reflector 125. Since each DMD/DLP imager 114, 116, 118, and 120 must be supplied with light, the light exiting the spinning color wheel filter 122 is separated into four separate beams or channels of light (ideally identical in intensity and color) through the use of light beam splitting prisms. A first light beam splitting prism 126 splits the original light beam 128 into two new light beams 130 and 132. Light beam 130 is directed from prism 126 into a second light beam splitting prism 134, resulting in light beams 136 and 138. Light beam 132 is directed from prism 126 into a third light beam splitting prism 140, resulting in light beams 142 and 144. Each of light beams 136, 138, 142, and 144 are directed into and delivered through optical fibers (or equivalent thereof) 146 to total internal reflection lenses (TIR lenses) 148 associated with DMD/DLP imagers 114, 116, 118, and 120, respectively, such that each imager 114, 116, 118, and 120 receives a single beam of light. TIR lenses are known in the art as being suitable for receiving light, directing the received light to a DMD/DLP imager, and finally outputting the light according to an image signal of the DMD/DLP imager. However, it will be appreciated that in an alternative embodiment, the TIR lenses may be replaced by field lenses. TIR lenses 148 are oriented to direct their output into an arrangement of reflective prisms 150 and optical blocks (or compensation optics) 152 so as to forward the four light beams 136, 138, 142, and 144 (or channels of light) (as altered by DMD/DLP imagers 114, 116, 118, and 120) into a projection optics system 154. Projection optics system 154 ultimately directs the light beams 136, 138, 142, and 144 onto regions 106, 108, 110, and 112, respectively, of the entire frame of the target display surface 104. The input signals sent from display controllers of DMD/DLP imagers 114, 116, 118, and 120 to the mirrors of the respective DMD/DLP imagers comprise only the data necessary to create the desired image to be projected onto the associated regions of display surface 104. Further, the received beams of light are manipulated by imagers 114, 116, 118, and 120 to carry motion picture image data corresponding to only a discrete portion of an entire motion picture image frame. It will be appreciated that in other embodiments of the present invention, more or fewer DLP imagers may be incorporated to achieve a higher or lower overall film screen resolution, respectively.

Figure 2:
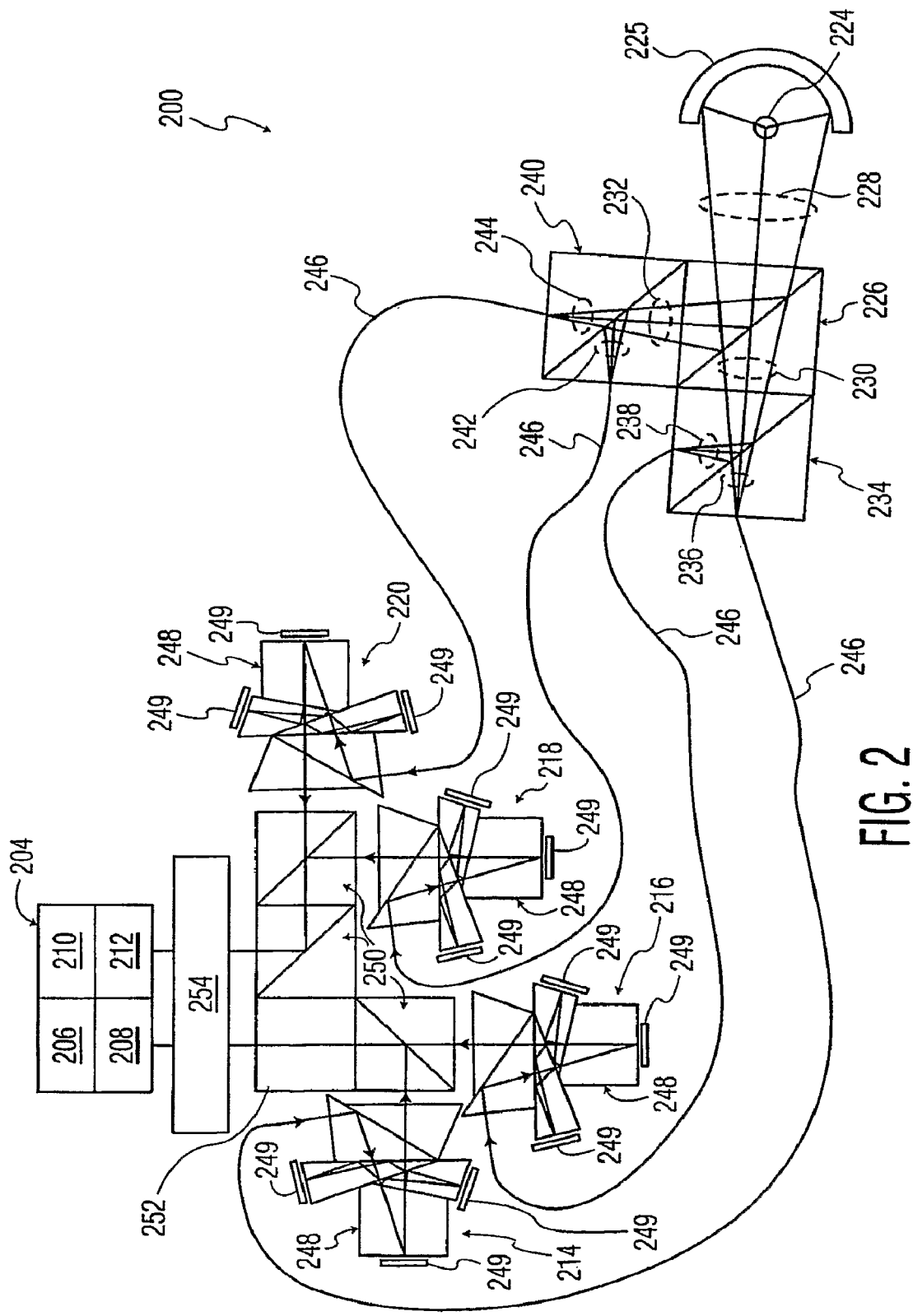
FIG. 2 is a schematic illustration of a high resolution digital micromirror device projection system according to a second embodiment of the present invention.

Referring now to FIG. 2 in the drawings, a high resolution DMD projection system according to a second embodiment of the present invention is illustrated. High resolution DMD projection system 200 is similar to system 100 in many ways including the fact that it advantageously utilizes a plurality of commercially available DMD/DLP imagers (each having resolution of about 2K×1K) to accomplish a total projected image resolution of about 4K×2K, a result acceptable by SMPTE standards. To accomplish this, the entire frame of a target display surface 204 is divided into four regions, an upper left region 206, a lower left region 208, an upper right region 210, and a lower right region 212. However, system 200 comprises four three-imager sets 214, 216, 218, and 220 each comprising three DMD/DLP imagers 249 (the three-imager type DMD/DLP imagers being known in the art) instead of four single-imager type imagers (like 114, 116, 118, and 120). Region 206 is to be projected onto by DMD/DLP imager set 214, region 208 is to be projected onto by DMD/DLP imager set 216, region 210 is to be projected onto by DMD/DLP imager set 218, and region 212 is to be projected onto by DMD/DLP imager set 220. Since each DMD/DLP imager of the three-DMD/DLP imager sets 214, 216, 218, 220 consistently manipulates a single color (red, green, or blue) there is no need for a color wheel filter (as needed in system 100).

In operation, white light or full spectrum light is emitted from a light source 224 possibly with guidance from an elliptical reflector 225. Since each DMD/DLP imager set 214, 216, 218, and 220 must be supplied with light, the light exiting the light source 224 is separated into four channels of light (ideally identical in intensity and color) through the use of light beam splitting prisms as was similarly provided for in system 100. A first light beam splitting prism 226 splits the original light beam 228 into two new light beams 230 and 232. Light beam 230 is directed from prism 226 into a second light beam splitting prism 234, resulting in light beams 236 and 238. Light beam 232 is directed from prism 226 into a third light beam splitting prism 240, resulting in light beams 242 and 244. Each of light beams 236, 238, 242, and 244 are directed into and delivered through optical fibers (or equivalent thereof) 246 to TIR lens/dichroic prism assemblies 248 associated with DMD/DLP imager sets 214, 216, 218, and 220, respectively. Assemblies 248 are known for splitting a light beam into three primary color light beams (red, green, and blue). TIR lens/dichroic prism assemblies 248 are known for receiving light, directing the received light to DMD/DLP imagers 249, and finally outputting the light. However, it will be appreciated that in an alternative embodiment, the TIR lens portion of the TIR lens/dichroic prism assemblies may be replaced by field lenses. Assemblies 248 are oriented to direct their output into an arrangement of reflective prisms 250 and optical blocks (or compensation optics) 252 so as to forward the four light beams 236, 238, 242, and 244 (or channels of light) (as altered by DMD/DLP imager sets 214, 216, 218, and 220) into a projection optics system 254. Projection optics system 254 ultimately directs the light beams 236, 238, 242, and 244 onto regions 206, 208, 210, and 212, respectively, of the entire frame of the target display surface 204. The input signals sent from display controllers of DMD/DLP imager sets 214, 216, 218, and 220 to the mirrors of the respective DMD/DLP imagers comprise only the data necessary to create the desired image to be projected onto the associated regions of display surface 204. It will be appreciated that in other embodiments of the present invention, more or fewer DLP imagers may be incorporated to achieve a higher or lower overall projected image resolution, respectively. By incorporating DMD/DLP imager sets 214, 216, 218, and 220, so-called rainbow effects (caused in part by the existence of a color wheel such as color wheel 122) are avoided and a higher level of color control is achieved.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A projection system, comprising:
    a light source for generating and emitting light;
    first, second, third and fourth sets of digital micromirror device imagers, each of the sets having first, second, and third digital micromirror device imagers, the first, second, and third digital micromirror device imagers each being configured to receive and reflect incident light of a different color;.
    an initial beam splitter for splitting the light from the light source into a first intermediate beam and a second intermediate beam;
    a first beam splitter for splitting the first intermediate beam into a first beam and second beam;
    a second beam splitter for splitting the second intermediate beam into a third beam and fourth beam;
    first, second, third and fourth dichroic prisms for receiving the first, second, third and fourth beams, respectively, each of the prisms splitting the respective beams into the incident light of three different colors; and
    a projection optics system for receiving and projecting reflected light of the three different colors from each of the sets of digital micromirror device imagers, the projection optics system being configured to direct the reflected light from each of the sets of digital micromirror device imagers to a different portion of a display surface.

2. The projection system according to claim 1, wherein each digital micromirror device imager has a resolution of about 2K×1K.

3. The projection system according to claim 1, wherein each of the sets of digital micromirror device imagers is configured to display an equal area of an entire frame of a motion picture image onto a display surface.

4. The projection system according to claim 1, wherein the dichroic prisms are optically disposed between the light source and at least one of the digital micromirror device imagers.

5. The projection system according to claim 4, wherein the the projection optics system is optically disposed between the dichroic prisms and the display surface.

6. The projection system according to claim 1, wherein each of the sets of digital micromirror device imagers projects the reflected light to correspond to motion picture image data of only a discrete portion of an entire motion picture image frame.

7. The projection system according to claim 1, wherein the three different colors are red, green, and blue.

* * * * *